United States Patent
Murakami et al.

(10) Patent No.: US 8,864,146 B2
(45) Date of Patent: Oct. 21, 2014

(54) VEHICLE HEIGHT CONTROL DEVICE FOR MOTORCYCLE

(71) Applicant: Showa Corporation, Saitama (JP)

(72) Inventors: Yosuke Murakami, Shizuoka (JP);
Tadashi Hachisuka, Shizuoka (JP);
Takahiro Kasuga, Tochigi (JP);
Fumiaki Ishikawa, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 13/798,771

(22) Filed: Mar. 13, 2013

(65) Prior Publication Data

US 2014/0077465 A1     Mar. 20, 2014

(30) Foreign Application Priority Data

Sep. 18, 2012   (JP) ................................. 2012-204978

(51) Int. Cl.
*B60G 17/00*      (2006.01)

(52) U.S. Cl.
USPC ...................................................... 280/6.157

(58) Field of Classification Search
CPC ............... B60G 2500/30; B60G 2400/252; B60G 2400/102; B60G 17/052; B60G 17/018; B62K 11/04; F02B 61/02
USPC ................. 280/6.157, 6.159, 5.514, 5.515; 180/219
See application file for complete search history.

(56) References Cited

U.S. PATENT DOCUMENTS

| | | | | |
|---|---|---|---|---|
| 5,022,501 A | * | 6/1991 | Hayashi et al. | 188/300 |
| 5,086,866 A | * | 2/1992 | Banjo et al. | 180/219 |
| 5,101,923 A | * | 4/1992 | Odagi et al. | 180/219 |
| 5,181,696 A | * | 1/1993 | Abe | 267/64.17 |
| 5,201,384 A | * | 4/1993 | Kiyota et al. | 180/219 |
| 2010/0044975 A1 | * | 2/2010 | Yablon et al. | 280/5.503 |

FOREIGN PATENT DOCUMENTS

| | | | | | |
|---|---|---|---|---|---|
| EP | 425273 A1 | * | 5/1991 | ........... | B60G 17/033 |
| EP | 427269 A1 | * | 5/1991 | ........... | B60G 17/033 |
| EP | 534574 A2 | * | 3/1993 | ........... | B62K 13/08 |
| EP | 544649 A2 | * | 6/1993 | ........... | B60G 17/033 |
| EP | 553901 A1 | * | 8/1993 | ........... | B60G 17/033 |
| JP | 04005187 A | * | 1/1992 | ........... | B62K 25/04 |
| JP | 8-22680 B | | 3/1996 | | |

* cited by examiner

*Primary Examiner* — Faye M. Fleming
(74) *Attorney, Agent, or Firm* — Keith H. Orum; Orum & Roth, LLC

(57) ABSTRACT

An object of the present invention is to provide a vehicle height control device for a motorcycle which enables a vehicle height to be retained at any intermediate position and which implements instantaneously switchover of the vehicle height. A vehicle height control device for a motorcycle has vehicle height detection means for detecting the vehicle height, a selector valve that connects, by switching, a jack chamber in a hydraulic jack to an oil reservoir chamber that communicates with oil chambers in a damper tube, and control means for controlling the switching of the selector valve based on a detection result from the vehicle height detection means in order to retain the vehicle height at any position.

24 Claims, 15 Drawing Sheets

VEHICLE HEIGHT CONTROL DEVICE FOR MOTORCYCLE

BACKGROUND OF THE INVENTION

1. Field of the Invention

The present invention relates to a vehicle height control device for a motorcycle.

2. Description of the Related Art

A vehicle height control device for a motorcycle is described in Japanese Examined Patent Publication No. H8-22680. Japanese Examined Patent Publication No. H8-22680 relates to a vehicle height control device for a vehicle utilizing a hydraulic damper, and more particularly to a two-level vehicle-height control device that reduces the vehicle height while the vehicle is stopped and that increases the vehicle height while the vehicle is traveling. According to Japanese Examined Patent Publication No. H8-22680, the vehicle height control device can utilize the telescopic motion of the hydraulic damper to extend the hydraulic damper to increase the vehicle height and to optionally change the vehicle height to a lower position.

Specifically, the vehicle height is optionally switched to a predetermined higher position or a predetermined lower position by utilizing oil discharged by a pumping operation of the hydraulic damper to selectively switch, via a manual operation or an automatic operation, a control valve between a position for increasing the vehicle height and a position for reducing the vehicle height.

[Patent Literature 1] Japanese Examined Patent Publication No. H8-22680

The vehicle height control device for the motorcycle described in Japanese Examined Patent Publication No. H8-22680 poses the following problem.

(1) The vehicle height control device adjusts the vehicle height between two levels, a high position and a low position and fails to retain the vehicle height at any position (intermediate height position) between the high position and the low position.

An object of the present invention is to provide a vehicle height control device for a motorcycle which enables the vehicle height to be retained at any intermediate position and which allows a selector valve to be efficiently controlled.

SUMMARY OF THE INVENTION

An aspect of the invention according to claim 1 provides a vehicle height control device for a motorcycle including: a damper tube that is provided on one of a vehicle body side and an axle side; a piston rod that is provided on the other one of the vehicle body side and the axle side and that slides through an oil chamber in the damper tube to extend and contract with respect to the damper tube; a hydraulic jack provided around one of the damper tube and the piston rod; a spring bearing that is supported by a plunger inserted in a jack chamber in a hydraulic jack; a suspension spring that is interposed between the spring bearing and a spring bearing provided around the other one of the damper tube and the piston rod; and a hydraulic pump that performs a pumping operation in conjunction with telescopic motion of the piston rod with respect to the damper tube to discharge hydraulic oil so that the hydraulic oil is supplied to the jack chamber in the hydraulic jack, with the vehicle height being adjusted by this telescopic motion of the piston rod with respect to the damper tube, wherein the vehicle height control device further includes: vehicle height detection means for detecting the vehicle height; a selector valve that connects through switching the jack chamber in the hydraulic jack to an oil reservoir chamber that communicates with an oil chamber in the damper tube; and control means for controlling the switching of the selector valve based on a detection result from the vehicle height detection means to retain the vehicle height at any position.

An aspect of the invention according to claim 2 is the aspect of the invention according to claim 1, further including a relief valve that releases oil discharged by the hydraulic pump into the oil reservoir chamber, the relief valve being controlled based on the detection result from the vehicle height detection means to retain the vehicle height at any position.

An aspect of the invention according to claim 3 is the aspect of the invention according to claim 1, wherein the selector valve is a four-port three-position solenoid valve and is selectively controlled to switch to any of three positions including a vehicle height increase position including a discharge check valve that is opened by hydraulic oil discharged by the hydraulic pump and a suction check valve that is opened by hydraulic oil sucked into the hydraulic pump, a vehicle height reduction position including a passage by which the hydraulic pump is in communication with the oil reservoir chamber and a passage by which the jack chamber in the hydraulic jack is in communication with the oil reservoir chamber, and a vehicle height retention position including a passage by which the hydraulic pump is in communication with the oil reservoir chamber and a passage that shuts the jack chamber in the hydraulic chamber off from the oil reservoir chamber.

An aspect of the invention according to claim 4 is the aspect of the invention according to claim 1, further including a sub-selector valve allowing an intermediate port provided at an intermediate height position in the jack chamber in the hydraulic jack to communicate with the oil reservoir chamber, the sub-selector valve being controlled based on the detection result from the vehicle height detection means in order to set a vehicle height adjustable end at the intermediate height position.

An aspect of the invention according to claim 5 is the aspect of the invention according to any one of claims 1 to 4, wherein the vehicle height detection means is projection height detection means for detecting a projection height of the plunger in the hydraulic jack.

An aspect of the invention according to claim 6 is the aspect of the invention according to any one of claims 1 to 4, wherein the vehicle height detection means is hydraulic-pressure detection means for detecting a hydraulic pressure in the jack chamber in the hydraulic jack.

An aspect of the invention according to claim 7 is the aspect of the invention according to any one of claims 1 to 4, wherein the vehicle height detection means is telescopic-stroke-length detection means for detecting a telescopic stroke length of the piston rod with respect to the damper tube.

An aspect of the invention according to claim 8 is the vehicle height control device for the motorcycle according to any one of claims 1 to 7, wherein a display device that displays a state of the vehicle height, a control state, and information on a vehicle body is provided to indicate a current state to a rider, and a display section includes a vehicle height adjustment section allowing the vehicle height to be adjusted to any position.

An aspect of the invention according to claim 9 is the aspect of the invention according to claim 8, wherein selection is made between automatic height control and manual height control.

(Claim 1)

(a) The vehicle height control device for the motorcycle has the vehicle height detection means for detecting the vehicle height, the selector valve that connects, by switching, the jack chamber in the hydraulic jack to the oil reservoir chamber that communicates with the oil chamber in the damper tube, and the control means for controlling switching of the selector valve based on the detection result from the vehicle height detection means to retain the vehicle height at any position.

Thus, the vehicle height can be retained at any intermediate height position between the maximum height position defined by the highest possible projection end of the plunger in the hydraulic jack and the minimum height position defined by the lowest possible sinking end of the plunger in the hydraulic jack.

(b) The solenoid valve is adopted as a selector valve serving as means for switching the vehicle height so as to allow the selector valve to be instantaneously switched to efficiently control the vehicle height.

(Claim 2)

(c) The vehicle height control device has the relief valve that releases oil discharged by the hydraulic pump into the oil reservoir chamber. The relief valve is controlled based on the detection result from the vehicle height detection means to retain the vehicle height at any position.

That is, during travel of the vehicle, when the vehicle height detection means detects a specific vehicle height (intermediate height position) to switch the relief valve in a controllable manner, hydraulic oil discharged by a pumping operation of the hydraulic pump is released into the oil reservoir chamber and prevented from being supplied to the hydraulic jack. This enables the vehicle height to be retained at a predefined specific intermediate height position.

(Claim 3)

(d) The selector valve is the four-port three-position solenoid valve and is selectively controlled to switch to any of the three positions including the vehicle height increase position including the discharge check valve that is opened by hydraulic oil discharged by the hydraulic pump and the suction check valve that is opened by hydraulic oil sucked into the hydraulic pump, the vehicle height reduction position including the passage by which the hydraulic pump is in communication with the oil reservoir chamber and the passage by which the jack chamber in the hydraulic jack is in communication with the oil reservoir chamber, and the vehicle height retention position including the passage by which the hydraulic pump is in communication with the oil reservoir chamber and the passage that shuts the jack chamber in the hydraulic chamber off from the oil reservoir chamber.

That is, during travel of the vehicle, when the vehicle height detection means detects a given vehicle height (intermediate height position) to switch the relief valve in a controllable manner, hydraulic oil discharged by a pumping operation of the hydraulic pump is released into the oil reservoir chamber and prevented from being supplied to the hydraulic jack. This enables the vehicle height to be retained at a predetermined given intermediate height position.

(Claim 4)

(e) The vehicle height control device has the sub-selector valve allowing the intermediate port provided at the intermediate height position in the jack chamber in the hydraulic jack to communicate with the oil reservoir chamber. The sub-selector valve is controlled based on the detection result from the vehicle height detection means in order to set the vehicle height adjustable end at the intermediate height position.

That is, when the sub-selector valve, controlled in accordance with a detection signal from the vehicle height detection means, sets the highest possible projection end of the plunger at the intermediate height position, the vehicle height can be prevented from being excessively reduced. On the other hand, setting the lowest possible sinking end of the plunger at the intermediate height position enables the vehicle height from being excessively increased. This allows an easy-to-use intermediate height position retention mode to be selected and used in a motorcycle for which a wide range of adjustable vehicle height is set.

(Claim 5)

(f) The vehicle height during the detection can be estimated by adopting the projection height detection means for detecting the projection height of the plunger in the hydraulic jack as the vehicle height detection means.

(Claim 6)

(g) The vehicle height during the detection can be estimated by adopting the hydraulic-pressure detection means for detecting the hydraulic pressure in the jack chamber in the hydraulic jack as the vehicle height detection means. At this time, applying a filter (low pass) to the detection result from the hydraulic-pressure detection means enables the vehicle weight (loading capacity) to be estimated. When the vehicle weight is high and the vehicle height begins to decrease, the vehicle height is increased to prevent the damper from being contracted to the limit. When the vehicle weight is low and the vehicle height begins to increase, the vehicle height is reduced to prevent the damper from being stretched to the limit.

(Claim 7)

(h) The vehicle height during the detection can be estimated by adopting the telescopic-stroke-length detection means for detecting the telescopic stroke length of the piston rod with respect to the damper tube as the vehicle height detection means. At this time, applying a filter (band pass) to the detection result from the telescopic-stroke-length detection means allows the recessed and protruding status (amplitude status) of the road surface to be estimated. When the road surface has a large amplitude, the vehicle height is increased to prevent the damper from being contracted to the limit or is adjusted to an appropriate value to prevent the damper both from being contracted to the limit and from being stretched to the limit. When the road surface has a small amplitude, the vehicle height is reduced to relax wind resistance if the vehicle is of an on-road type and to prevent the vehicle body from pitching if the vehicle is of an off-road type.

(Claim 8)

(i) The vehicle height control device in (a) to (h) described above further includes the display device that displays the state of the vehicle height, the control state, and the information on the vehicle body so as to indicate the current state to the rider. The display section includes the vehicle height adjustment section allowing the vehicle height to be adjusted to any position.

(Claim 9)

(j) In the vehicle height control device in (i) described above, selection is made between the automatic height control and the manual height control.

BRIEF DESCRIPTION OF THE DRAWINGS

FIG. 2A is a cross-sectional view showing an extension stroke, and FIG. 2B is a cross-sectional view showing a compression stroke;

FIG. 5A is a cross-sectional view showing an extension stroke, and FIG. 5B is a cross-sectional view showing a compression stroke;

DESCRIPTION OF THE PREFERRED EMBODIMENTS

Figure 1:
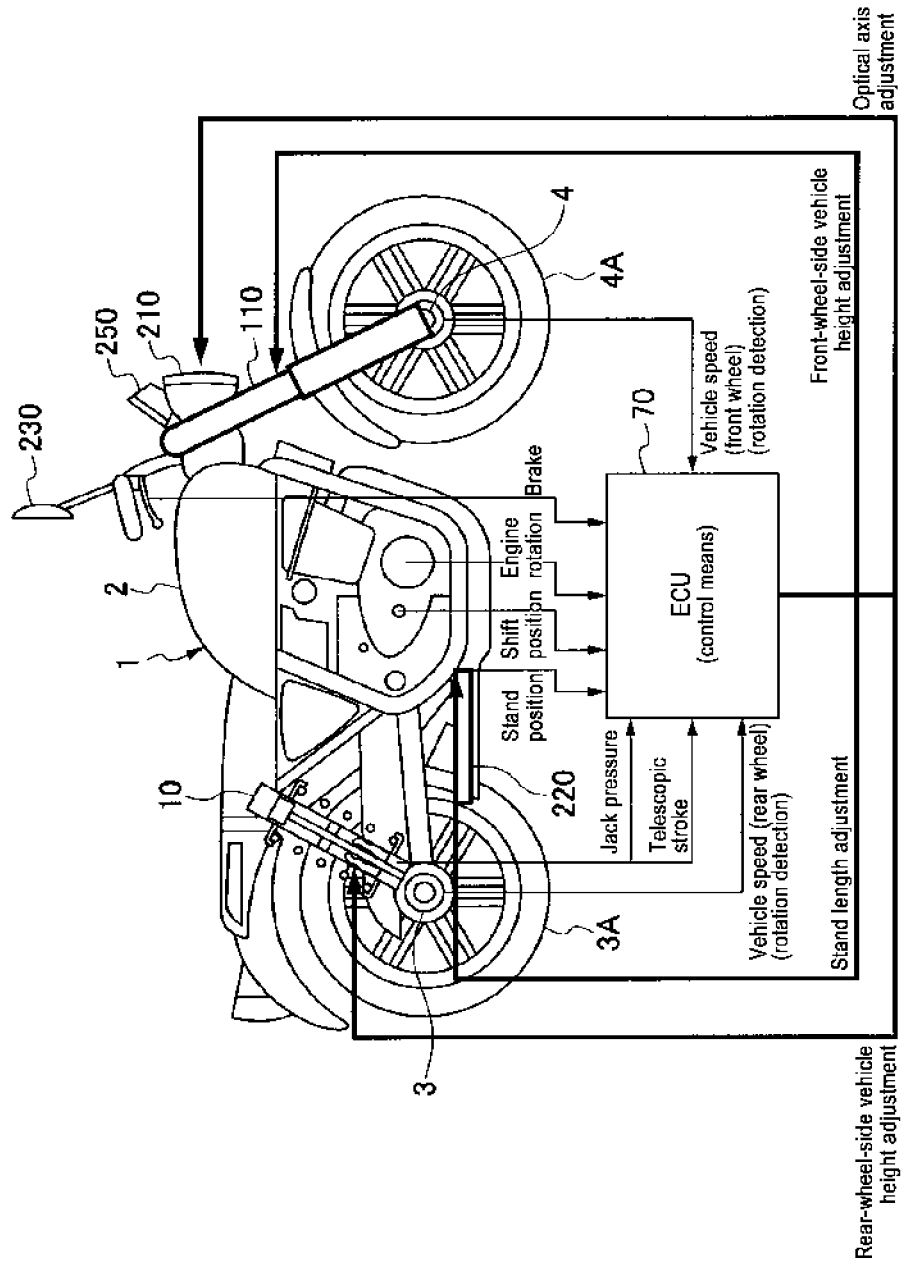
FIG. 1 is a schematic side view showing a motorcycle.
Figure 2:
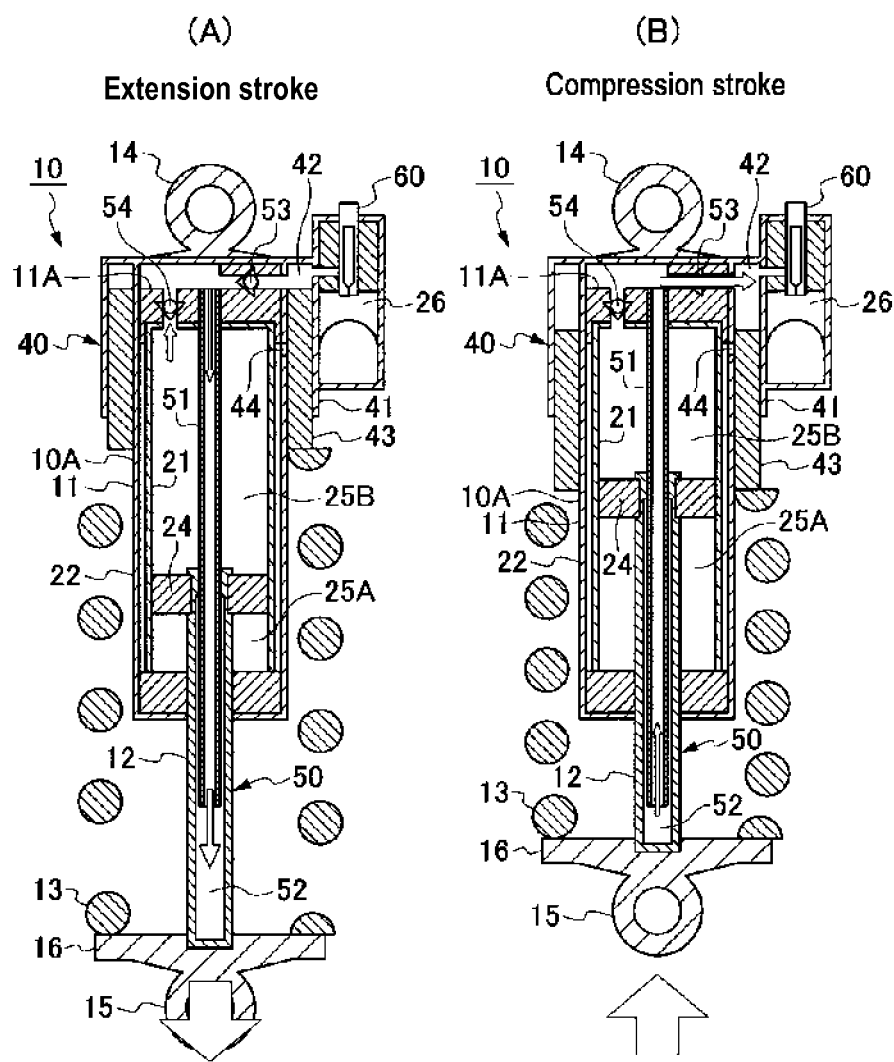
FIG. 2 shows a vehicle height increasing control mode of a rear suspension.

A motorcycle 1 shown in FIG. 1 includes a rear suspension 10 installed between a vehicle body 2 and a rear axle 3 (rear wheel 3A) and a front fork 110 installed between the vehicle body 2 and a front axle 4 (front wheel 4A).

Rear Suspension 10 (FIG. 2 to FIG. 4 and FIG. 8 to FIG. 10)

The rear suspension 10 has a damper 10A shown in FIG. 2 to FIG. 4 and FIG. 7. The damper 10A has a damper tube 11 attached to a vehicle body side and a piston rod 12 attached to an axle side. The piston rod 12 slides through the damper tube 11 via a piston 24 to extend and contract with respect to the damper tube 11. The piston rod 12 has a suspension spring 13 arranged along the outer periphery of the damper tube 11 and the piston rod 12. The damper tube 11 includes a vehicle body-side attachment member 14 fixed to an upper end portion thereof. The piston rod 12 includes an axle-side attachment member 15 fixed to a lower end portion thereof.

The damper tube 11 includes a hydraulic jack 41 of a rear-wheel-side vehicle height adjustment device 40 provided around an outer peripheral portion of an upper end side of the damper tube 11. A plunger 43 that partitions a jack chamber 42 is inserted into the hydraulic jack 41. An upper end of the suspension spring 13 is supported by the plunger 43. A lower end of the suspension spring 13 is supported by a spring bearing 16 provided on the axle-side attachment member 15.

In the rear suspension 10, the damper tube 11 is a double tube including an inner tube 21 and an outer tube 22. The piston 24 is fixed to an end of the piston rod 12 that is inserted into the inner tube 21. The rear suspension 10 includes a lower oil chamber 25A and an upper oil chamber 25B formed inside the inner tube 21 and partitioned by the piston 24, and an oil reservoir chamber 26 formed around an outer periphery of the outer tube 22. Hydraulic oil is contained in the oil chambers 25A and 25B and the oil reservoir chamber 26. The oil reservoir chamber 26 is in constant communication with the lower oil chamber 25A or the upper oil chamber 25B to compensate for a lack of an amount of hydraulic oil equivalent to the volume of the piston rod 12 which lack is associated with expansion and contraction of the rear suspension 10.

The rear suspension 10 has a damping force generator 27 (FIG. 8) in a communication path between the lower oil chamber 25A and the upper oil chamber 25B which path is provided in the piston 24 of the piston rod 12. The rear suspension 10 also has a damping force generator 28 (FIG. 8) in a communication path between the upper oil chamber 25B and the oil reservoir chamber 26 which path is provided in the damper tube 11. The damping force generators 27 and 28 dampen telescopic vibration of the damper tube 11 and the piston rod 12 associated with the absorption, by the suspension spring 13, of impact force from the road surface.

As shown in FIG. 2 to FIG. 4 and FIG. 8, the rear-wheel-side vehicle height adjustment device 40 includes the hydraulic jack 41 provided around the outer periphery of the outer tube 22 in the damper tube 11. The hydraulic jack 41 includes the plunger 43 that partitions the jack chamber 42. The plunger 43 is stuck out from the jack chamber 42 by hydraulic oil fed to the jack chamber 42 and supports the upper end of the suspension spring 13 on a lower surface of the plunger 43.

Figure 4:
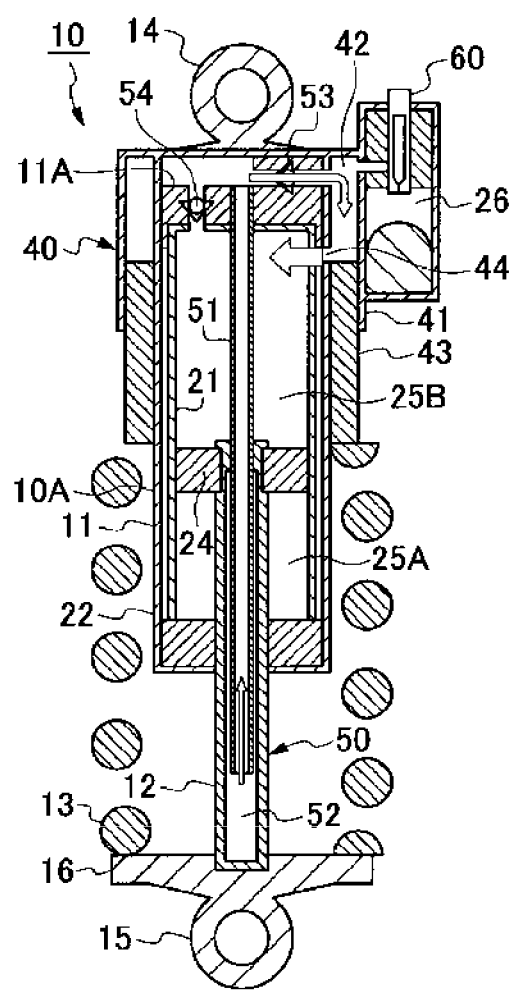
FIG. 4 is a cross-sectional view showing a vehicle height retention mode of the rear suspension.

The hydraulic jack 41 has an oil return passage 44 provided in the outer tube 22 and through which the hydraulic oil in the jack chamber 42 returns to the oil reservoir chamber 26 when the plunger 43 reaches a projecting end projecting from the jack chamber 42 (FIG. 4).

The rear-wheel-side vehicle height adjustment device 40 has a hydraulic pump 50 that performs a pumping operation in conjunction with the telescopic motion of the piston rod 12 with respect to the damper tube 11 to feed and discharge hydraulic oil to and from the jack chamber 42 in the hydraulic jack 41.

The hydraulic pump 50 includes a hollow pipe 51 provided upright in an end piece 11A of the damper tube 11 and inserted, in a slidable manner, into a pump chamber 52 formed by a hollow portion of the piston rod 12.

The hydraulic pump 50 includes a discharge check valve 53 allowing the hydraulic oil in the pump chamber 52 pressurized by the contracting motion of the piston rod 12 entering the damper tube 11 and the hollow tube 51 to be discharged toward the hydraulic jack 41 (FIG. 2B). The hydraulic pump 50 also includes a suction check valve 54 allowing the hydraulic oil in the inner tube 21 of the damper tube 11 to be sucked into the pump chamber 52 subjected to negative pressure by the extending motion of the piston rod 12 withdrawn from the damper tube 11 and the hollow pipe 51 (FIG. 2A).

Thus, the hydraulic pump 50 performs a pumping operation in conjunction with the telescopic motion of the piston rod 12 moving forward and backward with respect to the damper tube 11 and the hollow pipe 51 when the rear suspension 10 is vibrated by recesses and protrusions on the road surface while the vehicle is traveling. When the pump chamber 52 is pressurized by the pumping operation associated with the contracting motion of the piston rod 12, the oil in the pump chamber 52 opens the discharge check valve 53 and is discharged toward the hydraulic jack 41. When the pump chamber 52 is subjected to negative pressure by the pumping operation associated with the extending motion of the piston rod 12, the oil in the upper oil chamber 25B in the damper tube 11 opens the suction check valve 54 and is sucked into the pump chamber 52.

Figure 3:
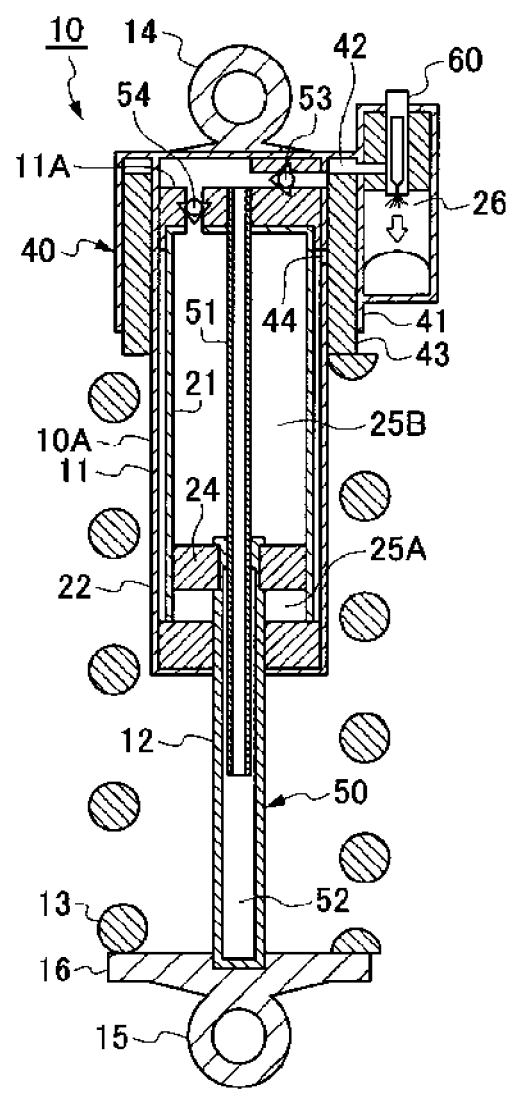
FIG. 3 is a cross-sectional view showing a vehicle height reducing control mode of the rear suspension.
Figure 8:
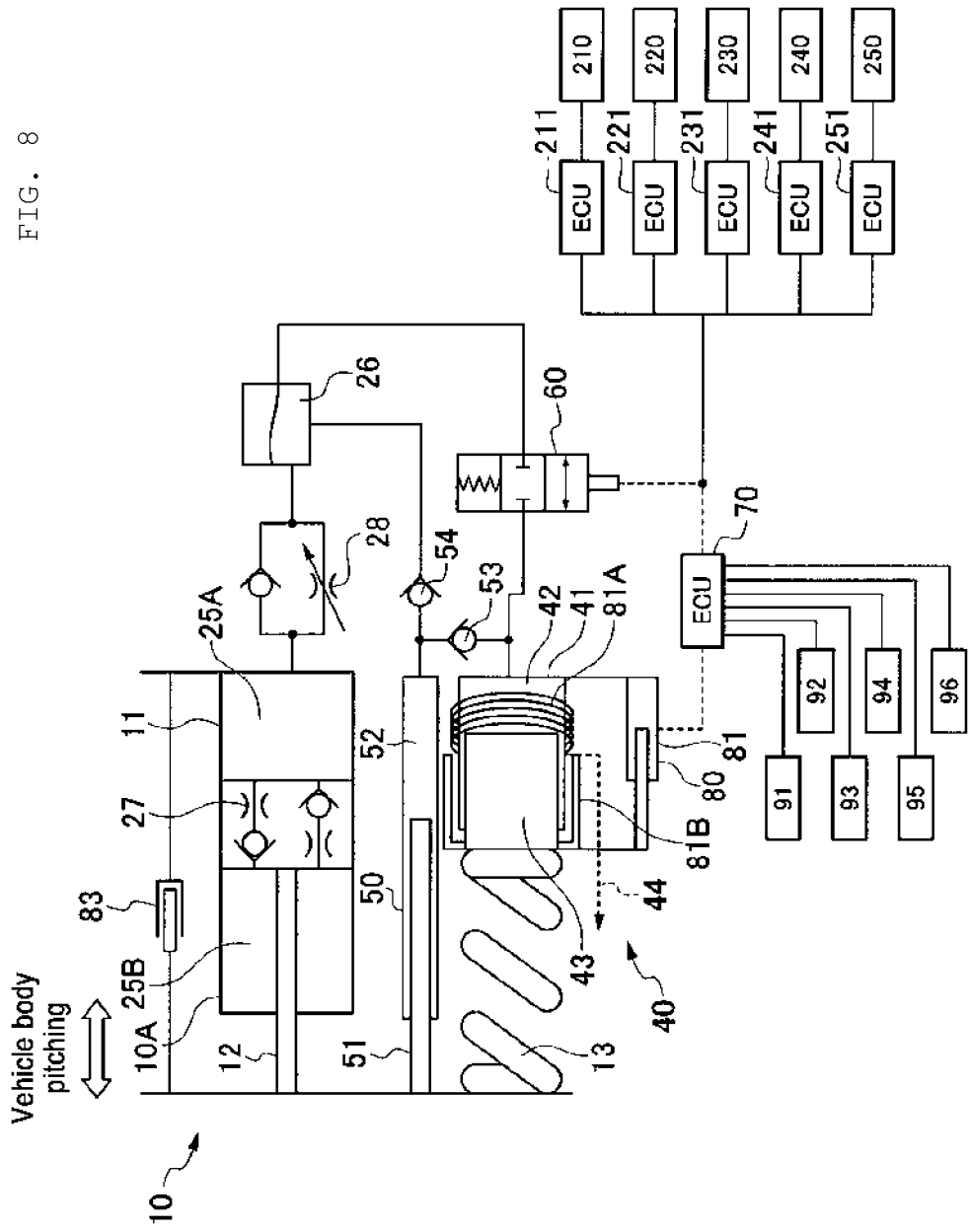
FIG. 8 is a control circuit diagram showing a vehicle height adjustment device.
Figure 9:
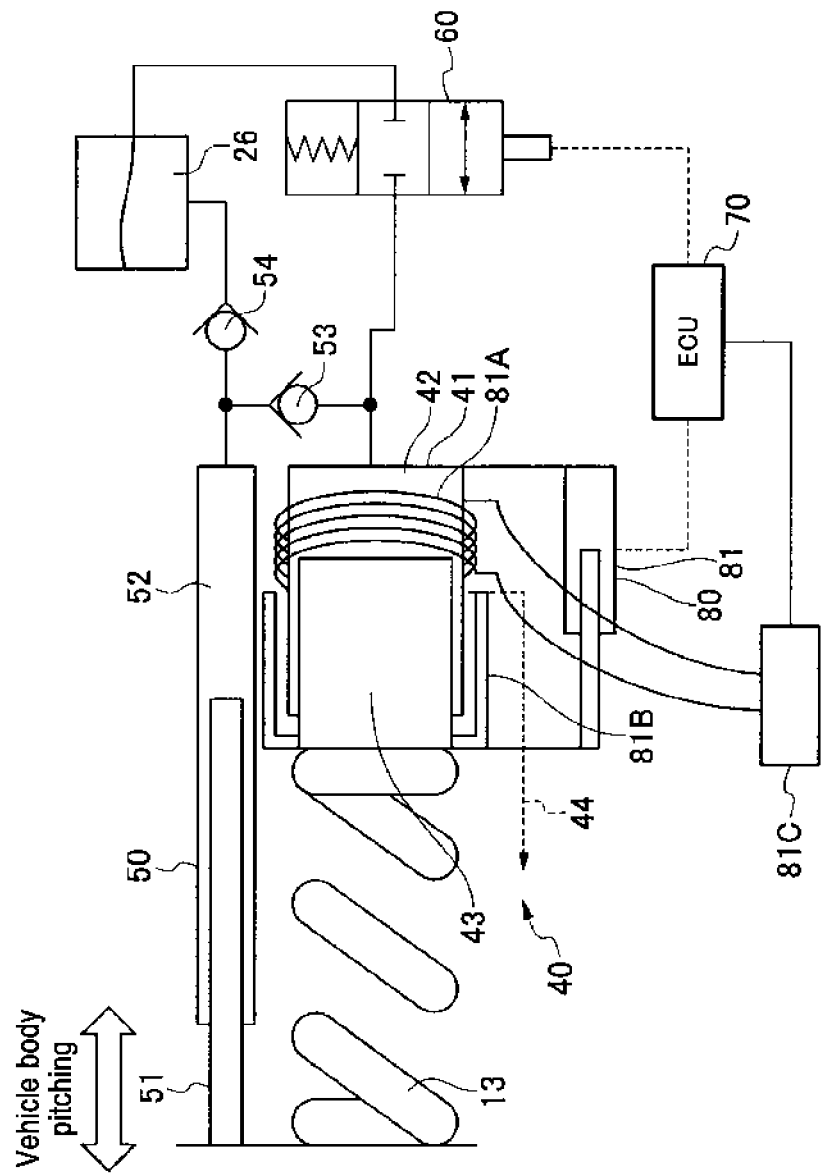
FIG. 9 is a circuit diagram showing an example of a control circuit.

The rear-wheel-side vehicle height adjustment device 40 has a selector valve 60 that is closed to stop the feeding of hydraulic oil to the jack chamber 42 in the hydraulic jack 41 or opened to discharge the hydraulic oil into the oil reservoir chamber 26 (or the oil chamber 25A or 25B in the damper tube 11) as shown in FIG. 3. The rear-wheel-side vehicle height adjustment device 40 has a control circuit as shown in FIG. 8 and FIG. 9. An ECU (control means) 70 opens and closes the selector valve 60 in a controllable manner to adjust the level of the hydraulic oil fed into the jack chamber 42 in the hydraulic chamber 41 by the hydraulic pump 50, which performs a pumping operation in conjunction with the telescopic motion of the piston rod 12 with respect to the damper tube 11. This further adjusts the projection height of the plunger 43 projecting from the jack chamber 42, thus controlling the vehicle height.

Figure 5:
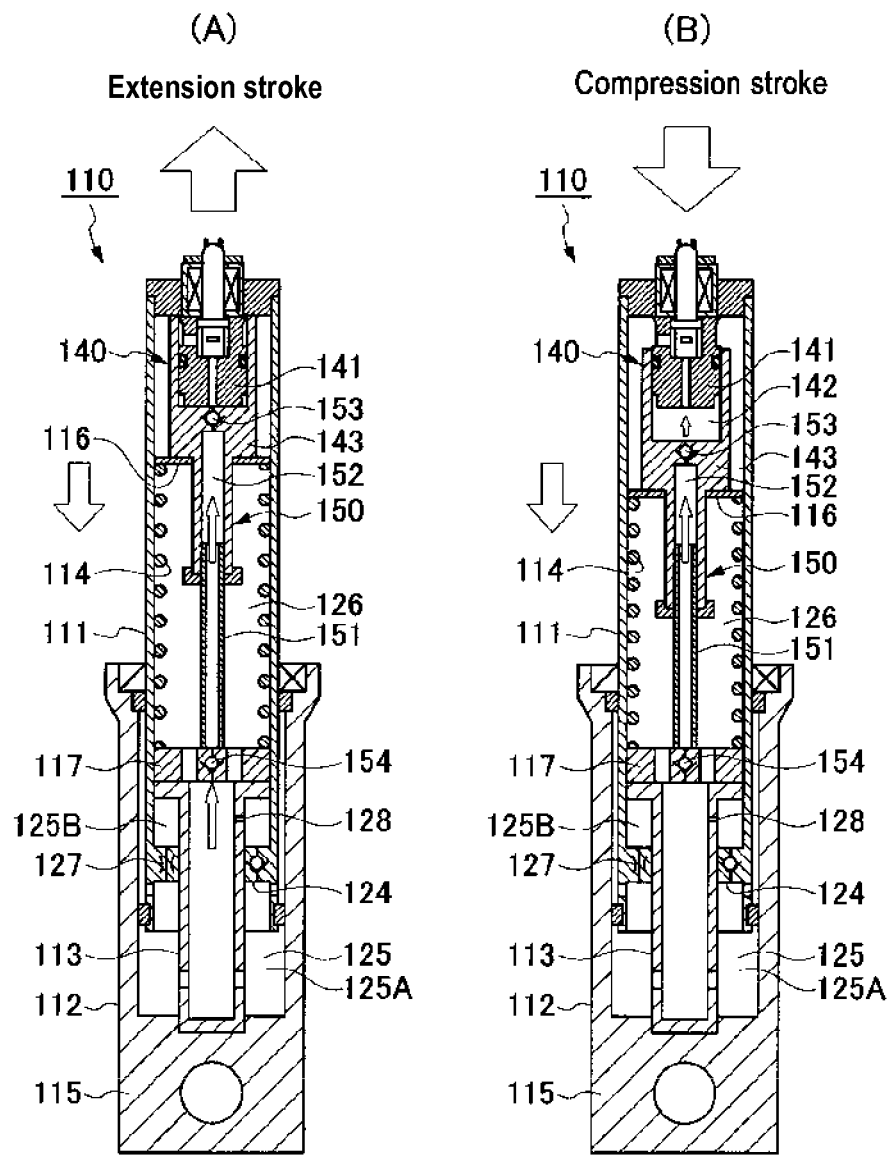
FIG. 5 shows a vehicle height increasing control mode of a front fork.
Figure 6:
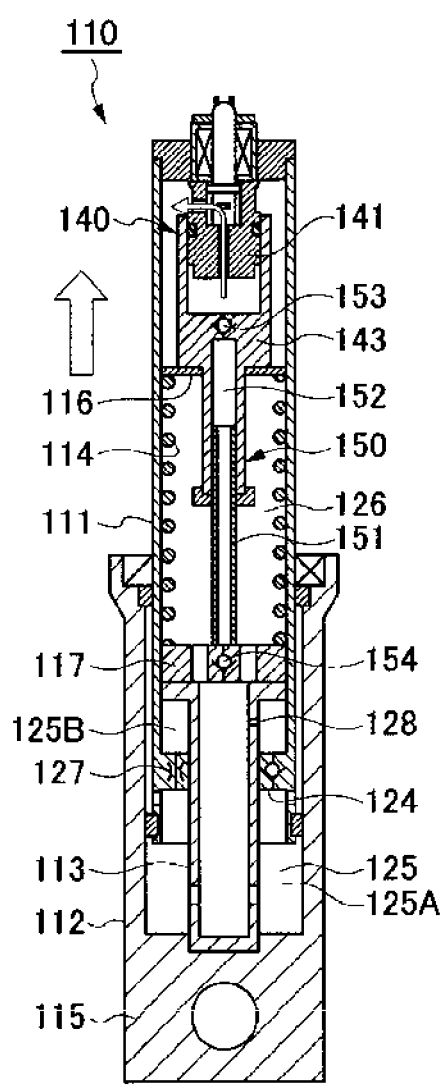
FIG. 6 is a cross-sectional view showing a vehicle height reducing control mode of the front fork.
Figure 7:
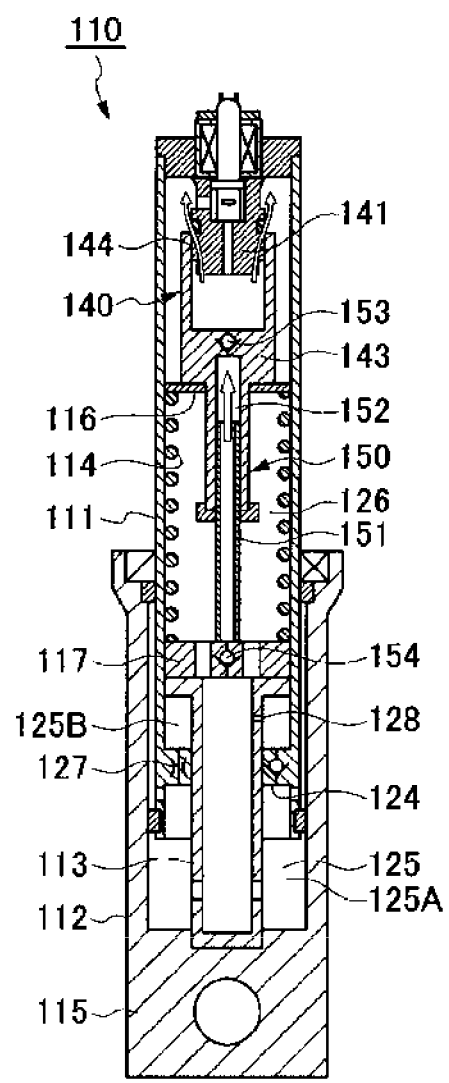
FIG. 7 is a cross-sectional view showing a vehicle height retention mode of the front fork.

Front Fork 110 (FIG. 5 to FIG. 7)

As shown in FIG. 5 to FIG. 7, the front fork 110 has a damper 110A. The damper 110A has a damper tube 111 attached to the vehicle body side and a bottom tube 112 and a piston rod 113 both attached to the axle side. The damper tube 111 is inserted into the bottom tube 112 through an upper end opening of the bottom tube 112 in a slidable manner. The piston rod 113 is provided upright in the internal center of the bottom tube 112, and slides through an oil chamber 125 located on a lower end side of the damper tube 111 to extend and contract with respect to the damper tube 111. A suspension spring 114 is arranged in an oil reservoir chamber 126 located on an upper end side of the damper tube 111. A vehicle body-side attachment member (not shown in the drawings) is fixed to the upper end portion of the damper tube 111. An axle-side attachment member 115 is fixed to a lower end portion of the bottom tube 112.

A hydraulic jack 141 of a front-wheel-side vehicle height adjustment device 140 is provided at the upper end portion of the damper tube 111. A plunger 143 that partitions the jack chamber 142 is fitted in the hydraulic jack 141. An upper end of the suspension spring 114 is supported by the plunger 143 via a spring bearing 116. A lower end of the suspension spring 114 is supported by an end piece and spring bearing 117 provided at an upper end portion of the piston rod 113.

The front fork 110 includes a piston 124 fixedly provided at the lower end side of the damper tube 111 and sliding over an outer periphery of the piston rod 113. The front fork 110 includes a lower oil chamber 125A and an upper oil chamber 125B formed around an outer periphery of the piston rod 113 and partitioned by the piston 124, and an oil reservoir chamber 126 formed inside an inner periphery of the piston rod 113 and an inner periphery of upper portion of the damper tube 111. Hydraulic oil is contained in the oil chambers 125A and 125B and the oil reservoir chamber 126. The oil reservoir chamber 126 is in constant communication with the lower oil chamber 125A or the upper oil chamber 125B to compensate for a lack of an amount of hydraulic oil equivalent to the volume of the damper tube 111 which lack is associated with expansion and contraction of the front fork 110.

The front fork 110 has a damping force generator 127 in a communication path between the lower oil chamber 125A and the upper oil chamber 125B which path is provided in the piston 124 of the damper tube 111. The front fork 110 also has a damping force generator 128 in a communication path between both the lower oil chamber 125A and the upper oil chamber 125B and the oil reservoir chamber 126 which path is provided in the piston rod 113. The damping force generators 127 and 128 dampen telescopic vibration of the damper tube 111, the bottom tube 112, and piston rod 113 associated with the absorption, by the suspension spring 114, of impact force from the road surface.

As shown in FIG. 5 to FIG. 7, the front-wheel-side vehicle height adjustment device 140 includes the hydraulic jack 141 provided at the upper end portion of the damper tube 111. The hydraulic jack 141 includes the plunger 143 that partitions the jack chamber 142. The plunger 143 is stuck out from the jack chamber 142 by hydraulic oil fed to the jack chamber 142 and supports the upper end of the suspension spring 114 on a lower surface of the plunger 143.

The hydraulic jack 141 has an oil return passage 144 provided in the hydraulic jack 141 and through which the hydraulic oil in the jack chamber 142 returns to the oil reservoir chamber 126 when the plunger 143 reaches a projecting end projecting from the jack chamber 142 of the hydraulic jack 141 (FIG. 7).

The front-wheel-side vehicle height adjustment device 140 has a hydraulic pump 150 that performs a pumping operation in conjunction with the telescopic motion of the piston rod 113 with respect to the damper tube 111 to feed and discharge hydraulic oil to and from the jack chamber 142.

The hydraulic pump 150 includes a hollow pipe 151 provided upright in an end piece 117 of the piston rod 113 and inserted, in a slidable manner, into a pump chamber 152 formed by a hollow portion of the plunger 143.

The hydraulic pump 150 includes a discharge check valve 153 allowing the hydraulic oil in the pump chamber 152 pressurized by the contracting motion of the piston rod 113 and the hollow tube 151 entering the damper tube 111 to be discharged toward the hydraulic jack 141 (FIG. 5B). The hydraulic pump 150 also includes a suction check valve 154 allowing the hydraulic oil in the oil reservoir chamber 126 to be sucked into the pump chamber 152 subjected to negative pressure by the extending motion of the piston rod 113 and the hollow tube 151 withdrawn from the damper tube 111 (FIG. 5A).

Thus, the hydraulic pump 150 performs a pumping operation in conjunction with the telescopic motion of the piston rod 113 and the hollow pipe 151 moving forward and backward with respect to the damper tube 111 when the front fork 110 is vibrated by recesses and protrusions on the road surface while the vehicle is traveling. When the pump chamber 152 is pressurized by the pumping operation associated with the contracting motion of the piston rod 113, the oil in the pump chamber 152 opens the discharge check valve 153 and is discharged toward the hydraulic jack 141. When the pump chamber 152 is subjected to negative pressure by the pumping operation associated with the extending motion of the piston rod 113, the oil in the oil reservoir chamber 126 opens the suction check valve 154 and is sucked into the pump chamber 152.

The front-wheel-side vehicle height adjustment device 140 has a selector valve 160 (not shown in the drawings) that is closed to stop the feeding of hydraulic oil to the jack chamber 142 in the hydraulic jack 141 or opened to discharge the hydraulic oil into the oil reservoir chamber 126 as shown in FIG. 6. The front-wheel-side vehicle height adjustment device 140 has a control circuit similar to the control circuit in the rear-wheel-side vehicle height adjustment device 40 shown in FIG. 8 and FIG. 9. The ECU (control means) 70 opens and closes the selector valve 160 in a controllable manner to adjust the level of the hydraulic oil fed into the jack chamber 142 in the hydraulic chamber 141 by the hydraulic pump 150, which performs a pumping operation in conjunction with the telescopic motion of the piston rod 113 with respect to the damper tube 111. This further adjusts the projection height of the plunger 143 projecting from the jack chamber 142, thus controlling the vehicle height.

The ECU 70 according to the present embodiment turns on and off the selector valve 60 (or selector valve 160), including a solenoid valve, in a controllable manner via detection signals from vehicle height detection means 80 (front-wheel-side vehicle height detection means 80F and rear-wheel-side vehicle height detection means 80R), a vehicle speed sensor 91 (front-wheel vehicle speed sensor 91F and rear-wheel vehicle speed sensor 91R), a shift position sensor 92, a G sensor (acceleration and deceleration sensor) 93, a side stand sensor 94, an engine rotation sensor 95, a brake sensor 96, and the like.

The adoptable vehicle height detection means 80 (front-wheel-side vehicle height detection means 80F and rear-wheel-side vehicle height detection means 80R) may be one of projection height detection means 81 for detecting the projection height of the plunger 43 in the hydraulic jack 41 (or the plunger 143 in the hydraulic jack 141), hydraulic-pressure detection means 82 for detecting the hydraulic pressure in the jack chamber 42 in the hydraulic jack 41 (or the jack chamber 142 in the hydraulic jack 141), and telescopic-stroke-length detection means 83 for detecting the telescopic stroke length of the piston rod 12 with respect to the damper tube 11 (or the piston rod 113 with respect to the damper tube 111), or a combination of at least two of these means.

Specifically, the projection height detection means 81 for the plunger 43 includes as shown in FIG. 8, for example, a coil 81A wound around an outer periphery of the hydraulic jack 41 and a cover 81B provided on the plunger 43 and placed around the outer periphery of the hydraulic jack 41. The projection height detection means 81 changes the impedance of the coil 81A depending on displacement of the plunger 43. An output from the coil 81A is transmitted to the ECU 70 via a signal processing circuit 81C. The ECU 70 can detect the vehicle height by detecting the projection height of the plunger 43 based on the oscillation frequency of the coil 81A output by the signal processing circuit 81C. Hence, the vehicle height detection means 80 can be integrated with the damper.

The rear-wheel-side vehicle height adjustment device 40 in the rear suspension 10 adopting the control circuit in FIG. 8 and FIG. 9 with the selector valve 60, which includes a single two-port two-position solenoid valve, will be described in detail in connection with a vehicle height adjusting operation of the motorcycle 1. A height adjusting operation by the front-wheel-side vehicle height adjustment device 140 in the front fork 110 is substantially similar to the vehicle height adjusting operation performed by the rear-wheel-side vehicle height adjustment device 40.

In a vehicle height reducing control mode in which the ECU 70 outputs an ON signal, the selector valve 60 is opened to connect the jack chamber 42 in the hydraulic jack 41 to the oil reservoir chamber 26 in the damper tube 11. Thus, hydraulic oil fed into the jack chamber 42 in the hydraulic jack 41 by the hydraulic pump 50 is discharged into the oil reservoir chamber 26. This lowers the level of the oil in the jack chamber 42 and thus the projection height of the plunger 43, enabling a vehicle height reducing operation.

On the other hand, in the vehicle height increasing control mode in which the ECU 70 outputs an OFF signal, the selector valve 60 is closed to shut the jack chamber 42 in the hydraulic jack 41 off from the oil reservoir chamber 26 in the damper tube 11 to prevent the hydraulic pump 50 from discharging the hydraulic oil fed into the jack chamber 42 in the hydraulic jack 41. This enables a vehicle height maintaining operation or a vehicle height increasing operation. At this time, the hydraulic pump 50 performs a pumping operation in conjunction with the extending motion of the piston rod 12 to enable the oil in the lower oil chamber 25A in the damper tube 11 to be sucked into the pump chamber 52 via the suction check valve 54. Then, the hydraulic pump 50 performs a pumping operation in conjunction with the contracting motion of the piston rod 12 to feed the oil in the pump chamber 52 into the jack chamber 42 in the hydraulic jack 41 via the discharge check valve 53. This enables a vehicle height increasing operation.

The selector valve 60 is a normally closed valve in FIG. 8 and FIG. 9 but may be a normally open valve.

Specifically, control modes carried out by the rear-wheel-side vehicle height adjustment device 40 areas follows.

(A) Vehicle Height Reducing Control Mode

In a vehicle height increasing control mode in which the selector valve 60 is closed to enable a vehicle height increasing operation while the vehicle is traveling or is stopped for a long time, the ECU 70 in the rear-wheel-side vehicle height adjustment device 40 shifts to a vehicle height reducing control mode in which the selector valve 60 is opened according to one of the following control conditions 1 to 3.

When opening the closed selector valve 60 after entering the vehicle height reducing control mode, the ECU 70 reduces an initial voltage applied to open the closed selector valve 60 (initial solenoid open voltage E1) to a solenoid open retention voltage E2 after a certain time since the valve was opened during a open-valve retention stage. Thus, a solenoid current fed to the selector valve 60 is saved. For example, E1=12 V and E2=4 V.

Furthermore, while the solenoid is in the closed-valve retention state, application of a normal voltage (activation voltage) at regular time intervals allows possible malfunction caused by vibration or the like to be prevented and enables recovery from the malfunction state.

1. Vehicle Speed Control

When the vehicle speed V is equal to or lower than a vehicle height reducing vehicle speed Vd (V≤Vd), the ECU 70 enters the vehicle height reducing control mode to open the selector valve 60 to enable a vehicle height reducing operation.

The ECU 70 predefines the vehicle height reducing vehicle speed Vd, which is, for example, 10 km/h.

2. Stoppage Predicted Time Control

The ECU 70 predicts a stoppage predicted time T of the vehicle. When the predicted stoppage predicted time T is equal to or shorter than a predetermined reference stoppage time Ta (T≤Ta), the ECU 70 enters the vehicle height reducing control mode and opens the selector valve 60 to enable a vehicle height reducing operation.

The ECU 70 calculates deceleration from the vehicle speed or detects deceleration via the G sensor, to predict the stoppage predicted time T based on the deceleration.

The ECU 70 sets the reference stoppage time Ta equal to a time required to discharge the hydraulic oil filled in the jack chamber 42 in the hydraulic jack 41 (a time required to discharge the hydraulic oil from the jack chamber 42 into the oil reservoir chamber 26 in the damper tube 11 via the selector valve 60).

In this case, the ECU 70 predefines a reference vehicle speed Va at which the prediction of the stoppage predicted time T of the vehicle is to be started, and predicts the stoppage predicted time T when the vehicle speed V is equal to or lower than the reference vehicle speed Va (V≤Va).

In the stoppage predicted time control, the ECU 70 may enter the vehicle height reducing control mode and open the selector valve 60 to enable a vehicle height reducing operation when the deceleration α of the vehicle is equal to or higher than a predetermined reference deceleration αa (α≥αa), instead of using the control conditions that T≤Ta and that V≤Va as described above.

The ECU 70 predefines the reference vehicle speed Va, the reference stoppage time Ta, and the reference deceleration αa. The reference vehicle speed Va is, for example, 40 km/h, the reference stoppage time Ta is, for example, 2.5 sec, and the reference deceleration αa is, for example, 4 km/h/sec.

The stoppage predicted time is a parameter calculated from moment-by-moment vehicle motion parameters in a predictive manner and representing an amount of time until the traveling vehicle is stopped in the immediately near future. The stoppage predicted time has a time dimension.

The actual comparative operation may apparently involve no degree of "time" because, for example, the time dimension is divided into components for the respective sides of the comparison expression or comparison is carried out for each element.

For example, one of the simplest arithmetic expressions for stoppage time prediction is $T=-V/\alpha=-V \cdot dt/dV$ (arithmetic expression for assumed constant acceleration). However, all of the following three comparison expressions have the same meaning. Even with a difference in comparison method resulting from the convenience of arithmetic operations, all of the comparison expressions effectively mean comparison with the stoppage predicted time.

$$T<c (c \text{ is a threshold; here}, c=Ta)$$

$$V<-c \cdot \alpha$$

$$-\alpha>c \cdot V$$

In the example in which comparison is carried out for each element, for example, comparison may be performed for each of the elements V and α, used to calculate the stoppage time, as in $(V<c1) \cap (-\alpha>c2)$ (c1 and c2 are thresholds). The results are ANDed together.

In this case, $T=-V/\alpha$ and thus the following expression is possible: $Ta=(-c1)/(-c2)=c1/c2$.

3. Side Stand Control

Upon detecting resetting of the side stand of the vehicle from a standby position to an operating position, the ECU 70 enters the vehicle height reducing control mode and opens the selector valve 60 to enable a vehicle height reducing operation. The following control may also be performed. The vehicle speed is monitored. When the vehicle speed is equal to or higher than a very low speed (for example, 5 km/s), the ECU 70 avoids the reducing control even if the stand is in the operating position. The ECU 70 performs the reducing control only when the vehicle speed is zero.

(B) Vehicle Height Increasing Control Mode

In the vehicle height reducing control mode in which the selector valve 60 is opened and kept open as described in (A), the ECU 70 in the rear-wheel-side vehicle height adjustment device 40 shifts to the vehicle height increasing control mode in which the selector valve 60 is closed according to one of the following control conditions 1 to 4.

When entering the vehicle height increasing control mode to close the open selector valve 60, the ECU 70 turns off a voltage E0 applied to the selector valve 60 (E0=0 V).

1. Vehicle Speed Control

When the vehicle speed V exceeds the vehicle height reducing vehicle speed Vd (or a vehicle height increasing vehicle speed Vu set independently of the vehicle height reducing vehicle speed Vd) (V>Vd or V>Vu), the ECU 70 halts the vehicle height reducing control mode, enters the vehicle height increasing control mode, and closes the selector valve 60 to enable a vehicle height increasing operation.

The ECU 70 presets the vehicle height reducing vehicle speed Vd (or the vehicle height increasing vehicle speed Vu). The height reducing vehicle speed Vd or the vehicle height increasing vehicle speed Vu is, for example, 40 km/h.

2. Parking Prediction Time Control

The ECU 70 predicts the stoppage predicted time T of the vehicle. When the predicted stoppage predicted time T exceeds a predetermined secondary reference stoppage time Tb (T>Tb), the ECU 70 halts the vehicle height reducing control mode, enters the vehicle height increasing control mode, and closes the selector valve 60 to enable a vehicle height increasing operation.

The ECU 70 predicts the stoppage predicted time T of the vehicle based on the deceleration (or acceleration) of the vehicle.

At this time, the ECU 70 predefines a secondary reference vehicle speed Vb at which the prediction of the stoppage time T of the vehicle is to be started. When the vehicle speed V exceeds the secondary reference vehicle speed Vb (V>Vb), the ECU 70 predicts the stoppage predicted time T.

In the stoppage predicted time control, the ECU 70 may halt the vehicle height reducing control mode, enter the vehicle height increasing control mode, and close the selector valve 60 to enable a vehicle height increasing operation when the acceleration β of the vehicle exceeds a predetermined reference acceleration βb (β>βb) instead of using the control conditions that T>Tb and that V>Vb as described above.

The ECU 70 predefines the secondary reference vehicle speed Vb, the secondary reference stoppage time Tb, and the reference acceleration βb. The secondary reference vehicle speed Vb is, for example, 40 km/h, the secondary reference stoppage time Tb is, for example, 3 sec, and the reference acceleration βb is, for example, 5 km/h/sec.

3. Long-Stoppage Control

When the stoppage time of the vehicle is equal to or longer than a predetermined continued stoppage time Tc, the ECU 70 halts the vehicle height reducing control mode, enters the vehicle height increasing control mode, and closes the selector valve 60 to enable a vehicle height increasing operation.

The ECU 70 predefines the continued stoppage time Tc of the vehicle. The continued stoppage time Tc is, for example, 30 sec.

4. Neutral Control

When the vehicle speed V=0 and the vehicle is in a neutral shift position, the ECU 70 halts the vehicle height reducing control mode, enters the vehicle height increasing control mode, and closes the selector valve 60 to enable a vehicle height increasing operation.

(c) Height Retention Mode

While the vehicle is traveling, the ECU 70 in the rear-wheel-side vehicle height adjustment device 40 retains the vehicle height at any intermediate height position preset as desired by opening and closing the selector valve 60 in a controllable manner based on a detection result from the vehicle height detection means 80 (rear-wheel-side vehicle height detection means 80R).

Figure 10:
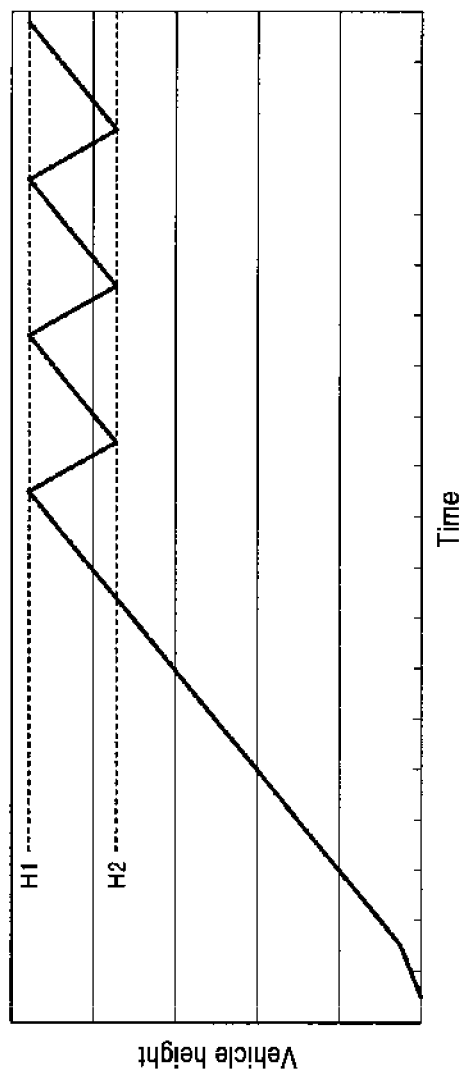
FIG. 10 is a diagram showing how the vehicle height is adjusted.

That is, the ECU 70 switches the selector valve 60 from an OFF operation (height increasing control mode) to an ON operation to open the selector valve 60 and sets an upper threshold for the vehicle beyond which the vehicle height starts to be reduced, to H1. The ECU 70 switches the selector valve 60 from the ON operation (height reducing control mode) to the OFF operation to close the selector valve 60 and sets a lower threshold for the vehicle beyond which the vehicle height starts to be increased, to H2. Thus, the ECU 70 retains the vehicle height of the motorcycle 1 during travel at an intermediate height position between H1 and H2 based on the detection result from the vehicle height detection means 80, as shown in FIG. 10.

Thus, the rear-wheel-side vehicle height adjustment device 40 as described above may retain the vehicle height at any intermediate height position between the maximum height position defined by the highest possible projection end of the plunger 43 in the hydraulic jack 41 and the minimum height position defined by the lowest possible sinking end of the plunger 43 in the hydraulic jack 41.

Furthermore, the selector valve can be efficiently controlled by adopting a solenoid valve as the selector valve 60 serving as the means for switching the vehicle height.

The vehicle height during the detection can be estimated by adopting the projection height detection means 81 for detecting the projection height of the plunger 43 in the hydraulic jack 41, as the vehicle height detection means 80 (rear-wheel-side vehicle height detection means 80R).

Furthermore, the vehicle height during the detection can be estimated by adopting the hydraulic-pressure detection means 82 for detecting the hydraulic pressure in the jack chamber 42 in the hydraulic jack 41 as the vehicle height detection means 80 (rear-wheel-side vehicle height detection device 80R). At this time, applying a filter (low pass) to the detection result from the hydraulic-pressure detection means 82 enables the vehicle weight (loading capacity) to be estimated. When the vehicle weight is high and the vehicle height begins to decrease, the vehicle height is increased to prevent the damper 10A from being contracted to the limit. When the vehicle weight is low and the vehicle height begins to increase, the vehicle height is reduced to prevent the damper 10A from being stretched to the limit.

Furthermore, the vehicle height during the detection can be estimated by adopting the telescopic-stroke-length detection means 83 for detecting the telescopic stroke length of the piston rod 12 with respect to the damper tube 11 as the vehicle height detection means 80 (rear-wheel-side vehicle height detection means 80R). At this time, applying a filter (band pass) to the detection result from the telescopic-stroke-length detection means 83 allows the recessed and protruding status (amplitude status) of the road surface to be estimated. When the road surface has a large amplitude, the vehicle height is increased to prevent the damper 10A from being contracted to the limit or is adjusted to an appropriate value to prevent the damper 10A both from being contracted to the limit and from being stretched to the limit. When the road surface has a small amplitude, the vehicle height is reduced to relax wind resistance if the vehicle is of an on-road type and to prevent the vehicle body from pitching if the vehicle is of an off-road type.

(D) Auxiliary-Device Control Mode

Based on the detection signal from the rear-wheel-side vehicle height detection means 80R, the ECU 70 in the rear-wheel-side vehicle height adjustment device 40 controls auxiliary devices provided in the vehicle, for example, a headlight 210, a side stand 220, a rearview mirror 230, a brake 240 with an ABS, and a display device 250 as follows.

(Headlight 210)

Based on the detection signal from the rear-wheel-side vehicle height detection means 80R, the ECU 70 adjusts the position, inclination, and the like of the optical axis of the headlight 210 to the optimum condition according to the vehicle height. At this time, the ECU 70 makes the adjustment via an ECU 211 for the headlight 210.

Thus, however the vehicle height varies, the optical axis of the headlight 210 is reset as appropriate according to the varying vehicle height. As a result, the appropriate range of illumination can be provided for the rider or the risk of hindering the vision of an oncoming driver can be eliminated.

(Side Stand 220)

Based on the detection signal from the rear-wheel-side vehicle height detection means 80R, the ECU 70 adjusts the length of the side stand 220 according to the vehicle height of the stopped vehicle. At this time, the ECU 70 makes the adjustment via an ECU 221 for the side stand 220.

That is, if the vehicle is stopped with the increased vehicle height, the side stand 220 may fail to reach the ground to cause the vehicle to fall down onto the ground. Thus, if the vehicle is stopped with the increased vehicle height, the side stand 220 needs to be extended to allow the vehicle to be safely stopped. Hence, the vehicle height of the stopped vehicle is detected to allow the length of the side stand 220 to be adjusted.

(Rearview Mirror 230)

Based on the detection signal from the rear-wheel-side vehicle height detection means 80R, the ECU 70 adjusts the position of the rearview mirror 230 according to the vehicle height of the stopped vehicle. At this time, the ECU 70 makes the adjustment via an ECU 231 for the rearview mirror 230.

That is, however the vehicle height varies, the position of the rearview mirror 230 is reset as appropriate according to the vehicle height. As a result, rear visibility is ensured.

(Brake 240 with the ABS)

Based on the detection signal from the rear-wheel-side vehicle height detection means 80R, the ECU 70 adjusts a threshold for the deceleration change rate of a wheel speed beyond which threshold the ABS of the brake 240 is actuated. At this time, the ECU 70 makes the adjustment via an ECU 241 for the brake 240 with the ABS.

That is, however the vehicle height varies, stable brake operability based on the ABS can be ensured.

(Display Device 250)

Based on the detection signal from the rear-wheel-side vehicle height detection means 80R, the ECU 70 displays the vehicle height on the display device 250. At this time, the ECU 70 allows the display device 250 to display the vehicle height.

Besides the function to display information on the vehicle height, the display device 250 has a function to display information on the vehicle body, control information, failures, and the like. Besides the display function, the display device 250 also has a function to make settings for height reduction, switching between an automatic operation and a manual operation, adjustment to any height position, and the like by operating the corresponding switches. Thus, the rider can perform preferred control and adjust the vehicle height to a preferred value by carrying out the corresponding operations.

(Spring Preload Adjustment)

Loads vary depending on the residual amount of fuel indicated on a fuel meter, and thus based on the amount of fuel, the vehicle height is corrected using a map or a damper stroke so as to correct a preload. Alternatively, a switch may be provided on a rear step, and the preload is corrected with the expectation that two persons ride the motorcycle.

The height adjusting operation of the rear-wheel-side vehicle height adjustment device 40 adopted for the rear suspension 10 of the motorcycle 1 has been described. However, the front-wheel-side vehicle height adjustment device 140 adopted for the front fork 110 can perform, using the detection result from the front-wheel-side vehicle height detection means 80F, a vehicle height adjusting operation that is substantially the same as the (A) height reducing control mode, the (B) height increasing control mode, the (C) height retention mode, and the (D) auxiliary device control mode carried out by the rear-wheel-side vehicle height adjustment device 40.

(E) Front and Rear Vehicle Height Interlocking Control Mode

Now, the vehicle height adjusting operation of the rear suspension 10 in the motorcycle 1 will be described in conjunction with a vehicle height interlocking control mode that interlocks with the vehicle height adjusting operation of the front fork 100.

That is, the rear-wheel-side vehicle height adjustment device 40 in the rear suspension 10 has the hydraulic pump 50 that performs a pumping operation in conjunction with the telescopic motion of the piston rod 12 to discharge hydraulic oil, the hydraulic jack 41 including the plunger 43 that is stuck out by the hydraulic oil discharged by the hydraulic pump 50, and the suspension spring 13 supported by the plunger 43 in the hydraulic jack 41. The hydraulic jack 41 is actuated in a controllable manner based on a detection result from the rear-wheel-side vehicle height detection means 80R provided in the rear suspension 10 in an auxiliary manner, thus adjusting the rear-wheel-side vehicle height.

Furthermore, the front-wheel-side vehicle height adjustment device 140 in the front fork 110 has the hydraulic pump 150 that performs a pumping operation in conjunction with the telescopic motion of the piston rod 113 to discharge hydraulic oil, the hydraulic jack 141 including the plunger 143 that is stuck out by the hydraulic oil discharged by the hydraulic pump 150, and the suspension spring 114 supported by the plunger 143 in the hydraulic jack 141. The hydraulic jack 141 is actuated in a controllable manner based on a detection result from the front-wheel-side vehicle height detection means 80F provided in the front fork 110 in an auxiliary manner, thus adjusting the front-wheel-side vehicle height.

The motorcycle 1 adjusts the vehicle height by interlocking a rear-wheel-side vehicle height adjusting operation associated with controllable actuation of the hydraulic jack 41 provided in the rear-wheel-side vehicle height adjustment device 40 in the rear suspension 10 with a front-wheel-side vehicle height adjusting operation associated with controllable actuation of the hydraulic jack 141 provided in the front-wheel-side vehicle height adjustment device 140 in the rear suspension 110. This allows the rider's driving position to be stabilized in spite of a variation in the vehicle height of the motorcycle 1.

Thus, the ECU 70 in the motorcycle 1 can adjust the vehicle height by synchronizing the rear-wheel-side vehicle height adjusting operation performed by the rear-wheel-side vehicle height adjustment device 40 with the front-wheel-side vehicle height adjusting operation performed by the front-wheel-side vehicle height adjustment device 140. Hence, the vehicle body 2 can be displaced up and down with respect to the front and rear axles 3 and 4 and parallel to the front and rear axles 3 and 4, allowing the rider's driving position to be kept stable.

Furthermore, when the vehicle height of the motorcycle 1 is reduced using the rear-wheel-side vehicle height adjustment device 40 and the front-wheel-side vehicle height adjustment device 140, the ECU 70 can adjust the vehicle height by allowing the rear-wheel-side vehicle height adjustment device 40 to perform the rear-wheel-side vehicle height reducing operation before allowing the front-wheel-side vehicle height adjustment device 140 to perform the front-wheel-side vehicle height reducing operation. Thus, the rear-wheel-side vehicle height can be reduced earlier so that the rider's feet can more appropriately touch the ground when the vehicle is stopped.

Furthermore, if the vehicle body 2 already leans forward as a result of a brake operation for stopping the vehicle, the forward leaning of the vehicle body 2 can be reduced by performing a vehicle height reducing operation first on the rear wheel side and then on the front wheel side.

In the vehicle height interlocking control mode in which the rear suspension 10 and the front fork 100 control the vehicle height in an interlocking manner, the hydraulic pump 50 in the rear suspension 10 that performs a pumping operation in conjunction with the telescopic motion of the piston rod 12 to discharge hydraulic oil may be used as a hydraulic pump that feeds hydraulic oil both to the hydraulic jack 41 of the rear suspension 10 and to the hydraulic jack 141 of the front fork 100. However, the hydraulic pump 150 in the front fork 100 that performs a pumping operation in conjunction with the telescopic motion of the piston rod 124 to discharge hydraulic oil may be used as a hydraulic pump for the above-described vehicle height interlocking operation performed by the rear suspension 10 and the front fork 100.

Now, a variation of the control circuit included in the rear-wheel-side vehicle height adjustment device 40 will be described (this also applied to the front-wheel-side vehicle height adjustment device 140).

Figure 11:
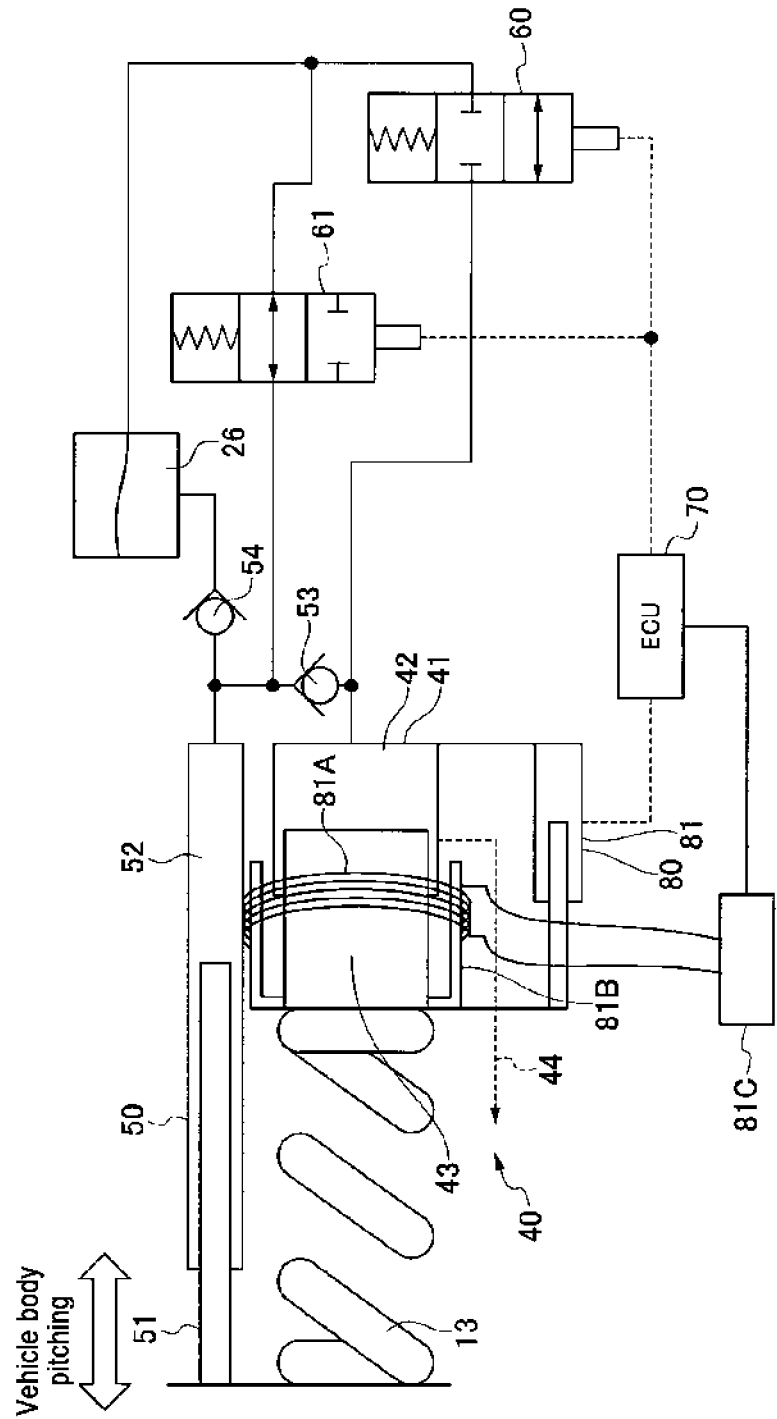
FIG. 11 is a circuit diagram showing a variation of the control circuit.
Figure 12:
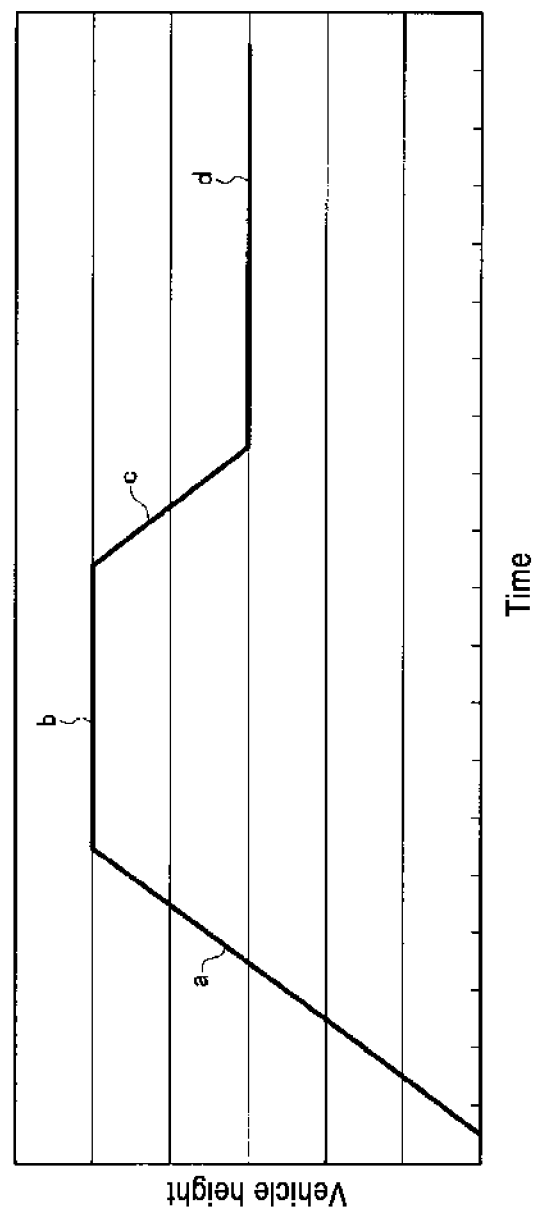
FIG. 12 is a diagram showing how the vehicle height is adjusted.

(Variation 1 of the Control Circuit in the Vehicle Height Adjustment Device 40) (FIG. 11 and FIG. 12)

The control circuit in Variation 1 of the vehicle height adjustment device 40 shown in FIG. 11 is different from the control circuit shown in FIG. 9 in that a relief valve 61 is provided in addition to the selector valve 60. The relief valve 61 is interposed in a communication path that allows the oil reservoir chamber 26 (or the oil chamber 25A or 25B) in the damper tube 11 to communicate with a portion of a discharge path from the pump chamber 52 in the hydraulic pump 50 which is closer to the pump chamber 52 than the discharge check valve 53. The ECU 70 can retain the vehicle height at any position by controlling the relief valve 61 as described in (1) to (4) based on the detection result from the vehicle height detection means 80R.

The relief valve 61 according to Variation 1 includes a normally-open two-port two-position solenoid valve (however, a normally closed type may also be used).

(1) The ECU 70 turns off and closes the selector valve 60, while turning on and closing the relief valve 61. Thus, the jack chamber 42 in the vehicle height adjustment device 40 and the pump chamber 52 in the hydraulic pump 50 are shut off from the oil reservoir chamber 26 in the damper tube 11. The hydraulic pump 50 performs a pumping operation to allow a vehicle height increasing operation to be carried out ((a) in FIG. 12).

(2) In contrast to (1) described above, the ECU 70 keeps selector valve 60 off and closed, while turning off and opening the relief valve 61. Then, with the jack chamber 42 in the vehicle height adjustment device 40 remaining shut off from the oil reservoir chamber 26 in the damper tube 11, the pump chamber 52 in the hydraulic pump 50 is connected to the oil reservoir chamber 26 in the damper tube 11. The vehicle height is retained at the maximum projection height position or intermediate height position set in (1) described above ((b) in FIG. 12).

(3) In contrast to (2) described above, the ECU 70 turns on and opens the selector valve 60 (the relief valve 61 may be turned either off or on). Then, the jack chamber 42 in the vehicle height adjustment device 40 is connected to the oil reservoir chamber 26 in the damper tube 11 to reduce the level of the oil in the jack chamber 42 and thus the projection height of the plunger 43 below the height set in (2) described above. Thus, a vehicle height reducing operation is performed ((c) in FIG. 12).

(4) In contrast to (3) described above, the ECU 70 turns off and closes the selector valve 60, while turning off and opening the relief valve 61. Thus, the jack chamber 42 in the vehicle height adjustment device 40 is connected to the oil reservoir chamber 26 in the damper tube 11, and the pump chamber 52 in the hydraulic pump 50 is shut off from the oil reservoir chamber 26 in the damper tube 11. The vehicle is retained at the intermediate height position set in (3) ((d) in FIG. 12).

Figure 13:
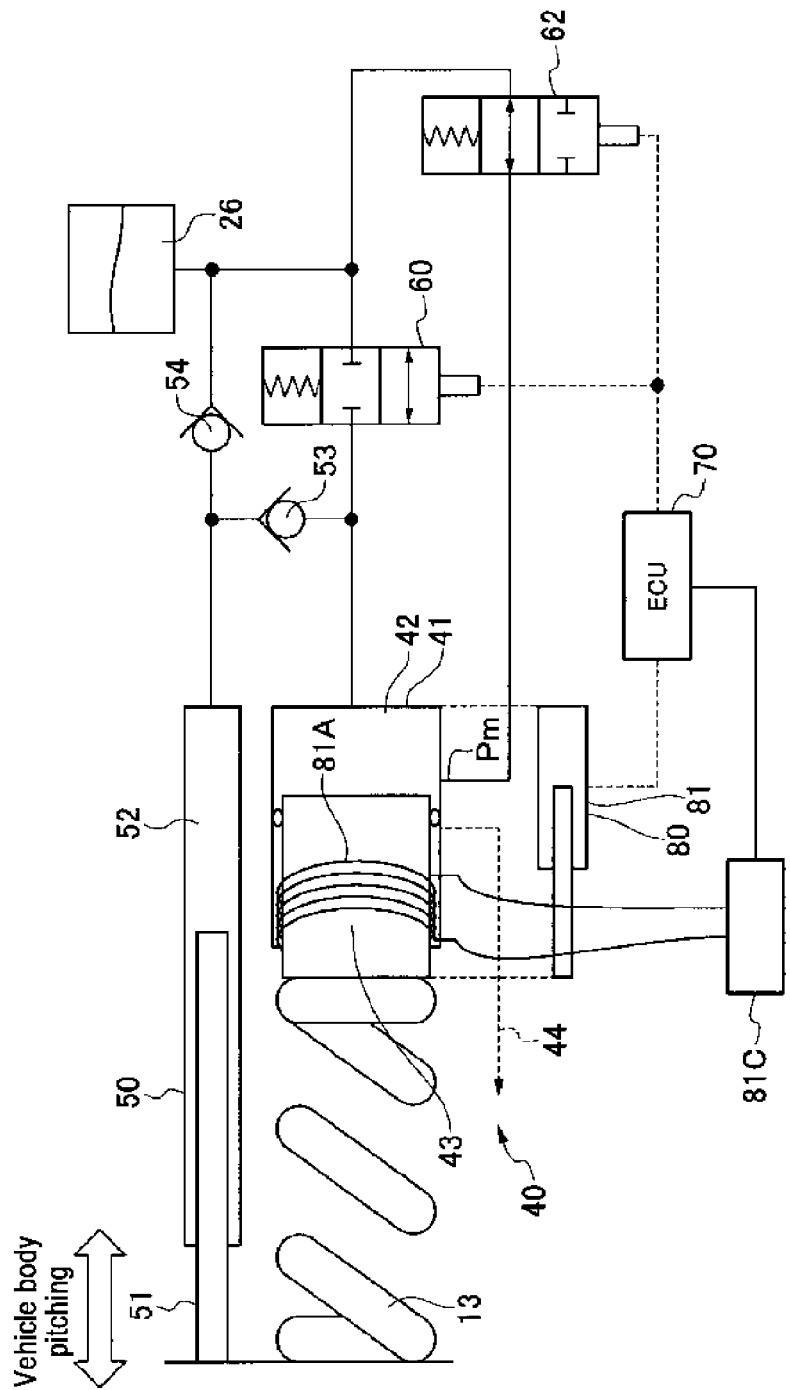
FIG. 13 is a circuit diagram showing a variation of the control circuit.
Figure 14:
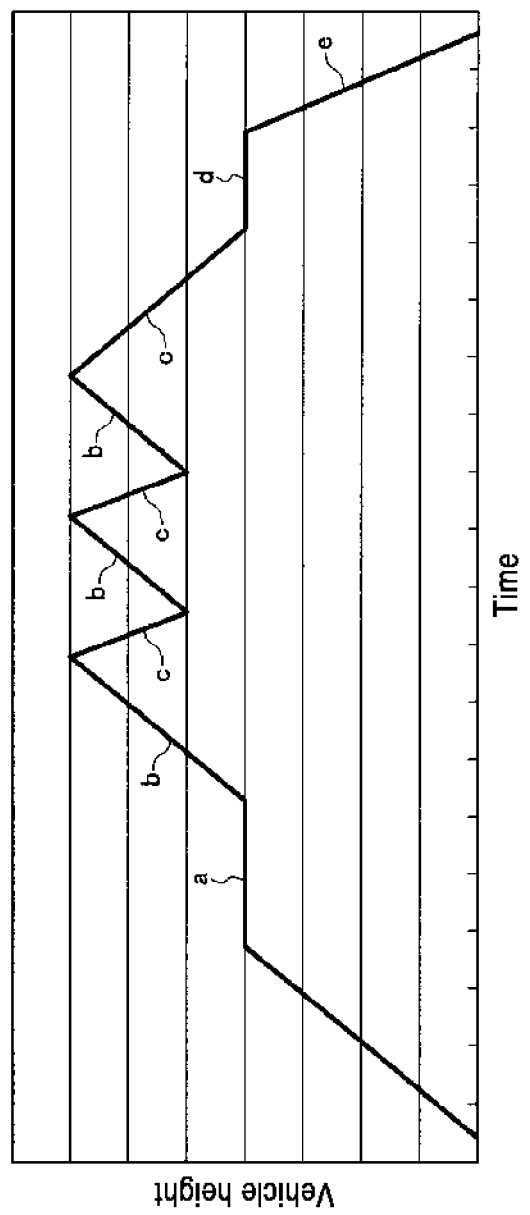
FIG. 14 is a diagram showing how the vehicle height is adjusted.

(Variation 2 of the Control Circuit in the Vehicle Height Adjustment Device 40) (FIG. 13 and FIG. 14)

The control circuit in Variation 2 of the vehicle height adjustment device 40 shown in FIG. 13 is different from the control circuit shown in FIG. 9 in that a sub-selector valve 62 is provided in addition to the selector valve 60. The sub-selector valve 62 enables an intermediate port Pm provided at the intermediate height position in the jack chamber 42 in the hydraulic jack 41 to selectively communicate with or shut off from the oil reservoir chamber 26 in the damper tube 11. Based on the detection result from the rear-wheel-side vehicle height detection means 80R, the ECU 70 controls the sub-selector valve 62 as described below in (1) to (5) to set a vehicle height adjustable end at the intermediate height position.

The sub-selector valve 62 according to Variation 2 includes a normally-open two-port two-position solenoid valve (however, a normally closed type may also be used).

(1) The ECU 70 turns off and closes the selector valve 60, while turning off and opening the sub-selector valve 62. Thus, the hydraulic pump 50 performs a pumping operation to allow a vehicle height increasing operation to be carried out until the level of the oil in the jack chamber 42 in the vehicle height adjustment device 40 reaches the intermediate port Pm. Furthermore, the vehicle height adjustable end is retained at the intermediate height position set by the intermediate port Pm ((a) in FIG. 14).

(2) In contrast to (1), the ECU 70 keeps the selector valve 60 off and closed, while turning on and closing the sub-selector valve 62. Then, the hydraulic pump 50 performs a pumping operation to allow the vehicle height to be increased above the position set by the intermediate port Pm as described in (1) ((b) in FIG. 14).

(3) In contrast to (2) described above, the ECU 70 keeps the selector valve 60 off and closed, while turning off and opening the sub-selector valve 62. Then, the jack chamber 42 in the vehicle height adjustment device 40 is connected to the oil reservoir chamber 26 in the damper tube 11 to reduce the level of the oil in the jack chamber 42 and thus the projection height of the plunger 43 below the height set in (2) described above. Thus, a vehicle height reducing operation is performed ((c) in FIG. 14).

(4) The vehicle height reducing operation in (3) described above allows the level of the oil in the jack chamber 42 in the vehicle height adjustment device 40 to reach the intermediate port Pm and then retains the vehicle height at the intermediate height position described in (1) and set by the intermediate port Pm ((d) in FIG. 14).

(5) In contrast to (4) described above, the ECU 70 turns on and opens the selector valve 60. Then, the jack chamber 42 in the vehicle height adjustment device 40 is connected to the oil reservoir chamber 26 in the damper tube 11 to reduce the level of the oil in the jack chamber 42 and thus the projection height of the plunger 43 below the height set in (4) described above. Thus, a vehicle height reducing operation is performed ((e) in FIG. 14).

Figure 15:
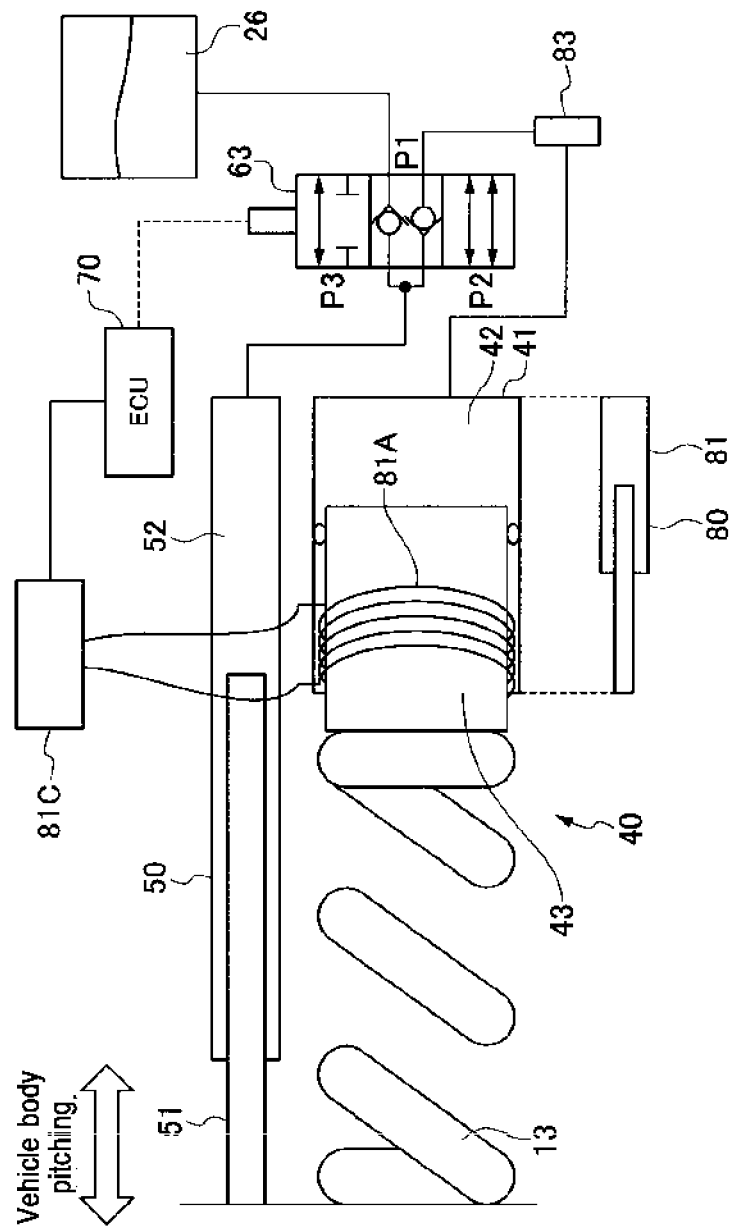
FIG. 15 is a circuit diagram showing a variation of the control circuit.

(Variation 3 of the Control Circuit in the Vehicle Height Adjustment Device 40) (FIG. 15)

The control circuit in Variation 3 of the vehicle height adjustment device 40 shown in FIG. 15 is different from the control circuit shown in FIG. 9 in that a selector valve 63 is used instead of the selector valve 60. The selector valve 63 includes a four-port three-position solenoid valve and is selectively switched, in a controllable manner, among a vehicle height increase position P1 including the discharge check valve 53 that is opened by hydraulic oil discharged by the hydraulic pump 50 and the suction check valve 54 that is opened by hydraulic oil sucked into the hydraulic pump 50, a vehicle height reduction position P2 including a passage through which the hydraulic pump 50 is in communication with the oil reservoir chamber 26 in the damper tube 11 and a passage through which the jack chamber 42 in the hydraulic jack 41 is in communication with the oil reservoir chamber 26, and a vehicle height retention position P3 including a passage through which the hydraulic pump 50 is in communication with the oil reservoir chamber 26 and a passage that shuts the jack chamber 42 in the hydraulic chamber 41 off from the oil reservoir chamber 26, as described below in (1) to (3).

(1) When the ECU 70 sets the selector valve 63 at the vehicle height increase position P1, the jack chamber 42 in the vehicle height adjustment device 40 and the pump chamber 52 in the hydraulic pump 50 are shut off from the oil reservoir chamber 26 in the damper tube 11. The hydraulic pump 50 performs a pumping operation to allow a vehicle height increasing operation to be carried out.

(2) When the ECU 70 sets the selector valve 63 at the vehicle height reduction position P2, the jack chamber 42 in the vehicle height adjustment device 40 is connected to the oil reservoir chamber 26 in the damper tube 11 to reduce the level of the oil in the jack chamber 42 and thus the projection height of the plunger 43. Thus, a vehicle height increasing operation is performed.

(3) When the ECU 70 sets the selector valve 63 at the vehicle height retention position P3, the jack chamber 42 in the vehicle height adjustment device 40 is shut off from to the oil reservoir chamber 26 in the damper tube 11, and the pump chamber 52 in the hydraulic pump 50 is connected to the oil reservoir chamber 26 in the damper tube 11. The vehicle height is retained at the maximum projection height position or the intermediate height position.

The embodiment of the present invention has been described in detail with reference to the drawings. However, the specific configuration according to the present invention is not limited to the embodiment. For example, any changes made to the design of the embodiment without departing from the spirits of the present invention are included in the present invention. For example, the selector valve 60 is not limited to the solenoid valve but may be an electrically operable valve of any other type such as a rotary type or a puppet type.

An aspect of the present invention provides a vehicle height control device for a motorcycle including a damper tube provided on one of a vehicle body side and an axle side, a piston rod provided on the other of the vehicle body side and the axle side and slides through an oil chamber in the damper tube to extend and contract with respect to the damper tube, a hydraulic jack provided on a first side of the damper tube and the piston rod, a suspension spring interposed between a spring bearing supported by a plunger inserted into a jack chamber in the hydraulic jack and a spring bearing provided on a second side of the damper tube and the piston rod, and a hydraulic pump that performs a pumping operation in conjunction with telescopic motion of the piston rod with respect to the damper tube to discharge hydraulic oil so that the hydraulic oil is fed to the jack chamber in the hydraulic jack, wherein the vehicle height control device adjusting a vehicle height by the telescopic motion of the piston rod with respect to the damper tube, wherein the vehicle height control device has height detection means for detecting the vehicle height, a selector valve that connects, in a switchable manner, the jack chamber in the hydraulic jack to an oil reservoir chamber that is in communication with an oil chamber in the damper tube, and control means for switching the selector valve in a controllable manner based on a detection result from the vehicle height detection means to retain the vehicle height at any position. Thus, the vehicle height adjustment device in the motorcycle can retain the vehicle height at any intermediate position and can instantaneously switch the vehicle height.

EXPLANATION OF REFERENCE NUMERALS

1 Motorcycle
2 Vehicle body
3 Axle
10 Rear suspension
10A Damper
11 Damper tube
12 Piston rod
13 Suspension spring
16 Spring bearing
25A and 25B Oil chambers
26 Oil reservoir chamber
40 Vehicle height adjustment device
41 Hydraulic jack
42 Jack chamber
43 Plunger
50 Hydraulic pump
60 Selector valve
70 ECU (control means)
80 and 80R Vehicle height detection means
81 Projection height detection means
82 Hydraulic pressure detection means
83 Telescopic-stroke-length detection means

What is claimed is:

1. A vehicle height control device for a motorcycle including a damper tube that is provided on one of a vehicle body side and an axle side, a piston rod that is provided on the other one of the vehicle body side and the axle side and that slides through an oil chamber in the damper tube to extend and contract with respect to the damper tube and a suspension spring, the vehicle height control device comprising:
a hydraulic jack provided around one of the damper tube and the piston rod;
a spring bearing that is provided on a plunger inserted in a jack chamber in a hydraulic jack, wherein the suspension spring is interposed between the spring bearing and a spring bearing provided around the other one of the damper tube and the piston rod; and
a hydraulic pump that performs a pumping operation in conjunction with telescopic motion of the piston rod with respect to the damper tube to discharge hydraulic oil so that the hydraulic oil is supplied to the jack chamber in the hydraulic jack,
with a vehicle height being adjusted by this telescopic motion of the piston rod with respect to the damper tube, wherein
the vehicle height control device further comprises:
vehicle height detection means for detecting the vehicle height;
a selector valve that connects, by switching, the jack chamber in the hydraulic jack to an oil reservoir chamber that communicates with an oil chamber in the damper tube; and
control means for controlling the switching of the selector valve based on a detection result from the vehicle height detection means to retain the vehicle height at any position.

2. The vehicle height control device for the motorcycle according to claim 1, further comprising a relief valve that releases hydraulic oil discharged by the hydraulic pump into the oil reservoir chamber, the relief valve being controlled based on the detection result from the vehicle height detection means to retain the vehicle height at any position.

3. The vehicle height control device for the motorcycle according to claim 1, wherein the selector valve is a four-port three-position solenoid valve and is selectively controlled to switch to any of three positions including a vehicle height increase position including a discharge check valve that is opened by hydraulic oil discharged by the hydraulic pump and a suction check valve that is opened by hydraulic oil sucked into the hydraulic pump, a vehicle height reduction position including a passage by which the hydraulic pump is in communication with the oil reservoir chamber and a passage by which the jack chamber in the hydraulic jack is in communication with the oil reservoir chamber, and a vehicle height retention position including a passage by which the hydraulic pump is in communication with the oil reservoir chamber and a passage that shuts the jack chamber in the hydraulic chamber off from the oil reservoir chamber.

4. The vehicle height control device for the motorcycle according to claim 1, further comprising a sub-selector valve allowing an intermediate port provided at an intermediate height position in the jack chamber in the hydraulic jack to communicate with the oil reservoir chamber, the sub-selector valve being controlled based on the detection result from the vehicle height detection means in order to set a vehicle height adjustable end at the intermediate height position.

5. The vehicle height control device for the motorcycle according to claim 1, wherein the vehicle height detection means is projection height detection means for detecting a projection height of the plunger in the hydraulic jack.

6. The vehicle height control device for the motorcycle according to claim 1, wherein the vehicle height detection means is hydraulic-pressure detection means for detecting a hydraulic pressure in the jack chamber in the hydraulic jack.

7. The vehicle height control device for the motorcycle according to claim 1, wherein the vehicle height detection means is telescopic-stroke-length detection means for detecting a telescopic stroke length of the piston rod with respect to the damper tube.

8. The vehicle height control device for the motorcycle according to claim 1, wherein a display device that displays a state of the vehicle height, a control state, and information on a vehicle body is provided to indicate a current state to a rider, and a display section comprises a vehicle height adjustment section allowing the vehicle height to be adjusted to any position.

9. The vehicle height control device for the motorcycle according to claim 8, wherein selection can be made between automatic height control and manual height control.

10. The vehicle height control device for the motorcycle according to claim 2, wherein the vehicle height detection means is projection height detection means for detecting a projection height of the plunger in the hydraulic jack.

11. The vehicle height control device for the motorcycle according to claim 2, wherein the vehicle height detection means is hydraulic-pressure detection means for detecting a hydraulic pressure in the jack chamber in the hydraulic jack.

12. The vehicle height control device for the motorcycle according to claim 2, wherein the vehicle height detection means is telescopic-stroke-length detection means for detecting a telescopic stroke length of the piston rod with respect to the damper tube.

13. The vehicle height control device for the motorcycle according to claim 2, wherein a display device that displays a state of the vehicle height, a control state, and information on a vehicle body is provided to indicate a current state to a rider, and a display section comprises a vehicle height adjustment section allowing the vehicle height to be adjusted to any position.

14. The vehicle height control device for the motorcycle according to claim 3, wherein the vehicle height detection means is projection height detection means for detecting a projection height of the plunger in the hydraulic jack.

15. The vehicle height control device for the motorcycle according to claim 3, wherein the vehicle height detection means is hydraulic-pressure detection means for detecting a hydraulic pressure in the jack chamber in the hydraulic jack.

16. The vehicle height control device for the motorcycle according to claim 3, wherein the vehicle height detection means is telescopic-stroke-length detection means for detecting a telescopic stroke length of the piston rod with respect to the damper tube.

17. The vehicle height control device for the motorcycle according to claim 3, wherein a display device that displays a state of the vehicle height, a control state, and information on a vehicle body is provided to indicate a current state to a rider, and a display section comprises a vehicle height adjustment section allowing the vehicle height to be adjusted to any position.

18. The vehicle height control device for the motorcycle according to claim 4, wherein the vehicle height detection means is projection height detection means for detecting a projection height of the plunger in the hydraulic jack.

19. The vehicle height control device for the motorcycle according to claim 4, wherein the vehicle height detection means is hydraulic-pressure detection means for detecting a hydraulic pressure in the jack chamber in the hydraulic jack.

20. The vehicle height control device for the motorcycle according to claim 4, wherein the vehicle height detection means is telescopic-stroke-length detection means for detecting a telescopic stroke length of the piston rod with respect to the damper tube.

21. The vehicle height control device for the motorcycle according to claim 4, wherein a display device that displays a state of the vehicle height, a control state, and information on a vehicle body is provided to indicate a current state to a rider, and a display section comprises a vehicle height adjustment section allowing the vehicle height to be adjusted to any position.

22. The vehicle height control device for the motorcycle according to claim 5, wherein a display device that displays a state of the vehicle height, a control state, and information on a vehicle body is provided to indicate a current state to a rider, and a display section comprises a vehicle height adjustment section allowing the vehicle height to be adjusted to any position.

23. The vehicle height control device for the motorcycle according to claim 6, wherein a display device that displays a state of the vehicle height, a control state, and information on a vehicle body is provided to indicate a current state to a rider, and a display section comprises a vehicle height adjustment section allowing the vehicle height to be adjusted to any position.

24. The vehicle height control device for the motorcycle according to claim 7, wherein a display device that displays a state of the vehicle height, a control state, and information on a vehicle body is provided to indicate a current state to a rider, and a display section comprises a vehicle height adjustment section allowing the vehicle height to be adjusted to any position.

\* \* \* \* \*